United States Patent [19]
Watanabe et al.

[11] Patent Number: 5,096,590
[45] Date of Patent: Mar. 17, 1992

[54] CONCENTRATION OF SOLUTION BY THE REVERSE OSMOSIS PROCESS

[75] Inventors: Atsuo Watanabe, Saitama; Mitsutoshi Nakajima; Hiroshi Nabetani, both of Ibaragi; Yasunori Yamada, Tochigi; Tsutomu Ohmori, Ibaragi, all of Japan

[73] Assignees: Director of National Food Research Institute, Ministry of Agriculture, Forestry and Fisheries, Ibaragi; Kagome Co., Ltd., Aichi, both of Japan

[21] Appl. No.: 762,159

[22] Filed: Sep. 18, 1991

Related U.S. Application Data

[63] Continuation of Ser. No. 538,540, Jun. 14, 1990, abandoned.

[30] Foreign Application Priority Data

Jun. 19, 1989 [JP] Japan .................................. 1-156197

[51] Int. Cl.$^5$ .............................................. B01D 61/08
[52] U.S. Cl. ..................... 210/644; 210/649; 210/195.2; 210/257.2; 210/321.72
[58] Field of Search ............... 210/634, 637, 641, 644, 210/649–652, 195.2, 257.2, 321.6, 321.64, 321.66, 321.72

[56] References Cited

U.S. PATENT DOCUMENTS 3,617,550 11/1971 Savion .
4,895,661 1/1990 Cadotte ............................. 210/490
4,902,417 2/1990 Lien ................................. 210/321.85

Foreign Application Priority Data

0070059 1/1983 Europe .
2510309 9/1976 Fed. Rep. of Germany .

OTHER PUBLICATIONS

European Search

*Primary Examiner*—Frank Sever
*Attorney, Agent, or Firm*—Irving M. Weiner; Joseph P. Carrier; Pamela S. Burt

[57] ABSTRACT

Provided is a multistage method and apparatus for concentrating a solution by reverse osmosis, comprising the steps and means for: maximizing the concentration of absolute in a solution in a multistage apparatus having only standard capacity pumps, including steps of providing first concentrating means for concentrating a solution to a first concentration, said first concentrating means comprising at least one concentrating unit which positioned upstream with respect to a direction in which a solution to be concentrated flows, and providing second concentrating means for concentrating the solution that has been concentrated by first concentrating means to a second concentration which is higher than said first concentrating means comprising at least one concentrating unit which is positioned downstream with respect to said direction; said concentrating units comprising consisting essentially of respective membrane modules and respective standard capacity pumps, the membrane module of the concentrating unit of said first concentrating means comprising a tight reverse osmosis membrane with a high rejection percentage sufficient to achieve a high concentration of said solution with a high flux density of solvent flowing through the membrane, and the membrane module of the concentrating unit of said second concentrating means comprising a loose reverse osmosis membrane with a lower rejection percentage sufficient to easily achieve a further concentration of said first concentrating means with a high flux density of solution flowing through the membrane.

11 Claims, 7 Drawing Sheets

4TH-STAGE REJECTION PERCENTAGE (%)

FIG. 5

5TH-STAGE REJECTION PERCENTAGE (%)

FIG. 6

6TH-STAGE REJECTION PERCENTAGE (%)

FIG. 7

7TH-STAGE REJECTION PERCENTAGE (%)

CONCENTRATION OF SOLUTION BY THE REVERSE OSMOSIS PROCESS

BACKGROUND OF THE INVENTION

1. Field of the Invention

The present invention relates to an apparatus for and a method of concentrating solutions such as fruit juices, and more particularly to an apparatus for and a method of concentrating solutions with a membrane module which comprises a reverse osmosis membrane.

2. Description of the Relevant Art

There have heretofore been known concentrating apparatus which include membrane modules comprising reverse osmosis membranes. A solution to be concentrated is supplied into the membrane module. Then, a pressure higher than the osmotic pressure is applied to the solution in the membrane module to force pure water to pass from the solution through the membrane, thereby concentrating the solution.

The conventional concentrating apparatus with the reverse osmosis membrane have however suffered certain processing limitations. More specifically, the osmotic pressure ($\pi$) of a solution is related to its concentration (C) as follows:

$$\pi = 1.43653 \times C + 68.1016 \times C^3$$

As can be seen from the above equation, the osmotic pressure of a solution is proportional to its concentration. Since a solution to be concentrated has to be subjected to a pressure higher than the osmotic pressure in the concentrating apparatus with the reverse osmosis membrane, it is necessary to employ a large-capacity pressure pump for applying a higher pressure if the solution has to be concentrated to a higher concentration. As the concentration of the solution becomes higher, the flux density of pure water flowing through the membrane is greatly reduced, resulting in a reduction in the concentrating efficiency. Therefore, there is a limitation on the concentration which can be achieved even if the large-capacity pressure pump is employed.

SUMMARY OF THE INVENTION

According to the present invention, there is provided an apparatus for concentrating a solution by reverse osmosis, comprising first concentrating means for concentrating a solution, the first concentrating means comprising at least one concentrating unit and being positioned upstream with respect to a direction in which a solution to be concentrated flows, and second concentrating means for concentrating the solution which has been concentrated by the first concentrating means, the second concentrating means comprising at least one concentrating unit and being positioned downstream with respect to said direction, the concentrating units comprising respective membrane modules. The membrane module of the concentrating unit of the first concentrating means comprises a tight reverse osmosis membrane with a higher rejection percentage, and the membrane module of the concentrating unit of the second concentrating means comprises a loose reverse osmosis membrane with a lower rejection percentage.

According to the present invention, there is also provided a method of concentrating a solution by reverse osmosis, comprising the steps of concentrating, to a first concentration, a solution with first concentrating means comprising at least one concentrating unit which is positioned upstream with respect to a direction in which a solution to be concentrated flows, the concentrating unit of the first concentrating means having a membrane module comprising a tight reverse osmosis membrane with a high rejection percentage, and concentrating, to a second concentration which is higher than the first concentration, the solution that has been concentrated by the first concentrating means, with second concentrating means comprising at least one concentrating unit which is positioned downstream with respect to said direction, and the concentrating unit of the second concentrating means having a membrane module comprising a loose reverse osmosis membrane with a lower rejection percentage.

The multistage concentrating apparatus according to the present invention is able to obtain a concentrate of much higher concentration than the conventional one-stage apparatus simply by applying substantially the same pressure as with the conventional apparatus, to the membrane modules.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
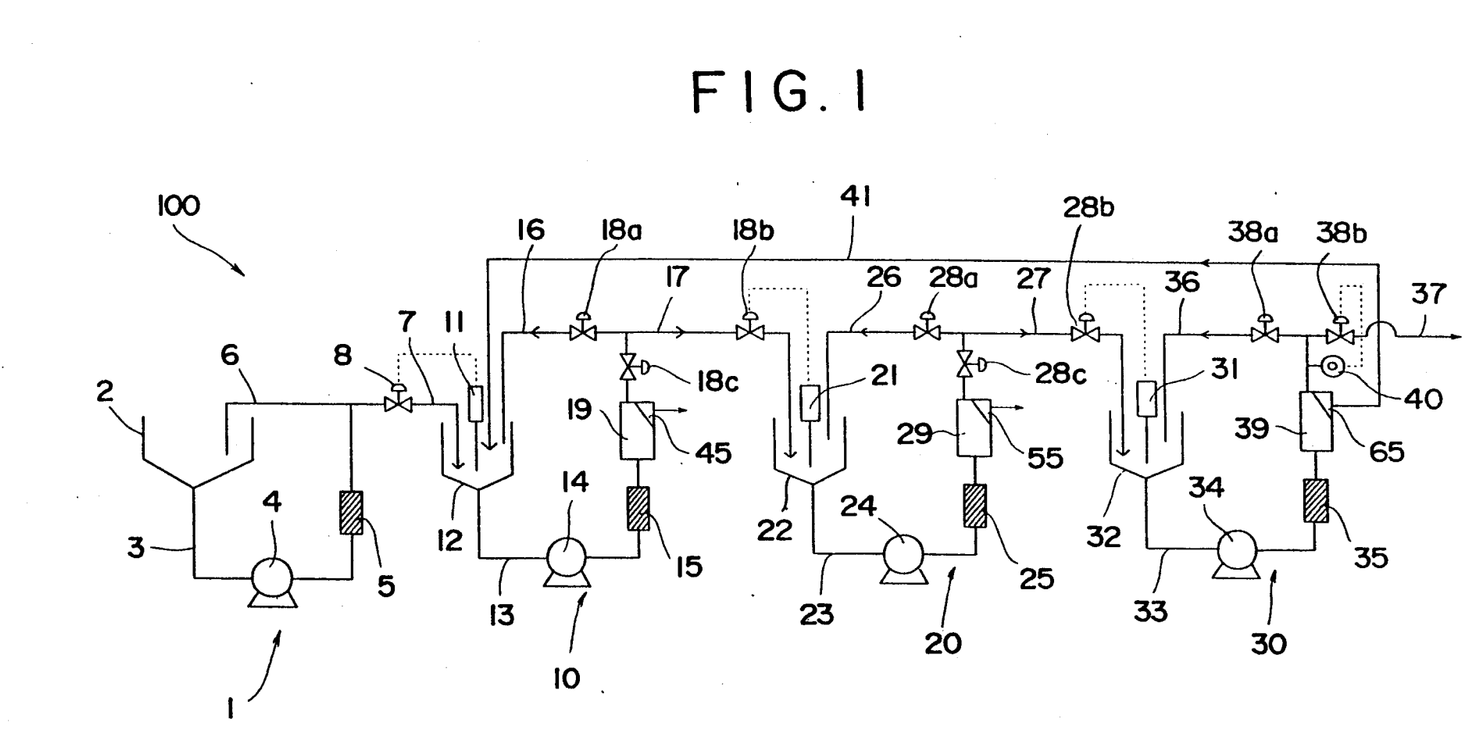
FIG. 1 is a schematic diagram of a three-stage concentrating apparatus according to an embodiment of the present invention.

FIG. 1 schematically shows a three-stage concentrating apparatus according to the present invention. The concentrating apparatus, generally designated by the reference numeral 100, comprises a solution supply unit 1, a first concentrating unit 10, a second concentrating unit 20, and a third concentrating unit 30, the units 1, 10, 20, 30 being successively arranged downstream in the order named.

The solution supply unit 1 has a reservoir tank 2 for storing a solution such as a fruit juice or the like, a pump 4 connected to a pipe 3 extending from the bottom of the reservoir tank 2, and a chiller 5 also connected to the pipe 3 downstream of the pump 4, for cooling the solution which has been heated by the pump 4. At a position downstream of the chiller 5, the pipe 3 is branched into a circulation pipe 6 for returning the solution to the reservoir tank 2 and a supply pipe 7 for supplying the solution to the first concentrating unit 10. The supply pipe 7 has a valve 8 which can be selectively opened and closed by a control signal from a level meter 11 which is associated with a tank 12 of the first concentrating unit 10.

The second and third concentrating units 20, 30 have respective tanks 22, 32 which are also associated with level meters 21, 31, respectively, for sending control signals to respective valves 18b, 28b of the first and second concentrating units 10, 20. Feed pipes 13, 23, 33 extend from the bottoms of the tanks 12, 22, 32, respectively, and are connected to pumps 14, 24, 34, respectively, and chillers 15, 25, 35, respectively. The first, second, and third concentrating units 10, 20, 30 also have respective membrane modules 19, 29, 39 which are disposed downstream of the respective chillers 15, 25, 35 and associated with respective liquid chambers 45, 55, 65.

Each of the membrane modules 19, 29 of the first and second concentrating units 10, 20 comprises a complete-rejection-type tight reverse osmosis membrane having a rejection percentage of 99% or more, whereas the membrane module 39 of the third concentrating unit 30 comprises an incomplete-rejection-type loose reverse osmosis membrane having a rejection percentage of about 50%.

The first concentrating unit 10 has a set of valves 18a, 18c connected to a circulation pipe 16 extending from the membrane module 19 to the tank 12. The valve 18b is connected to a supply pipe 17 extending from the membrane module 19 to the tank 22 of the second concentrating unit 20. Similarly, the second concentrating unit 20 has a set of valves 28a, 28c connected to a circulation pipe 26 extending from the membrane module 29 to the tank 22. The valve 28b is connected to a supply pipe 27 extending from the membrane module 29 to the tank 32 of the third concentrating unit 30. The valves 18b, 28b can selectively be opened and closed by control signals from the level meters 21, 31 of the second and third concentrating units 20, 30. The third concentrating unit 30 has a valve 38a connected to a circulation pipe 36 extending from the membrane module 39 to the tank 32 and a valve 38b connected to a recovery pipe 37. The valve 38b can selectively be opened and closed by a control signal from a densimeter 40 which is connected to the pipe 33 for detecting the concentration of the processed solution. The liquid chamber 65 of the membrane module 39 of the third concentrating unit 30 is connected to a return pipe 41 which allows a liquid that has passed through the loose reverse osmosis membrane to return to the tank 12 of the first concentrating unit 10.

A concentrating method which is carried out by the concentrating apparatus of the above construction will be described below.

With the valve 8 open, the pump 4 of the solution supply unit 1 is operated to feed a solution, such as a fruit juice, from the reservoir tank 2 to the tank 12 of the first concentrating unit 10. When the level of the solution in the tank 12 has reached a certain height, the level meter 11 detects the level and closes the valve 8. Then, the pump 14 feeds the supplied amount of solution to the membrane module 19.

Concentration of the solution in the first concentrating unit 10 is effected as follows: First, the valves 18a, 18c are opened, and the valve 18b is closed. Then, the pump 14 is activated to supply the solution from the tank 12 to the membrane module 19. Water (which may still contain a small amount of solute) is now forced through the tight reverse osmosis membrane of the membrane module 19, and is removed from the liquid chamber 45. The solution which has been concentrated flows through the circulation pipe 16 back to the tank 12. The above cycle is repeated until the solution is concentrated to a certain concentration. Then, the valve 18a is closed and the valve 18b is opened to supply the solution from the first concentrating unit 10 to the second concentrating unit 20. The solution is further concentrated in the second concentrating unit 20 in the same manner as in the first concentrating unit 10, after which the solution is supplied to the third concentrating unit 30.

Since the loose reverse osmosis membrane is employed in the third concentrating unit 30, the liquid or water which has passed therethrough still contains a large amount of solute. The liquid returns from the liquid chamber 65 through the return pipe 41 to the tank 12 of the first concentrating unit 10, so that it will further be concentrated in the first and second concentrating units 10, 20. When the desired concentration of the solution achieved by the third concentrating unit 3 is detected by the densimeter 40, the valve 38a is closed and the valve 38b is opened, thereby recovering the concentrate through the recovery pipe 37.

Table, given below, shows experimental results obtained by inventive apparatus and a conventional apparatus. In the experiment, clear apple juice having a concentration ranging from 10.0 to 11.0 Brix was concentrated to a target concentration of 40.0 Brix. All membrane modules in the inventive apparatus used in the experiment were of the spiral type, having an effective membrane area of 2.4 m$^2$ at each concentrating unit stage. The tight reverse osmosis membranes used were made of NTR-7199 manufactured by Nitto Denko, and the loose osmosis membranes used were made of NTR-7450 and NTR-7430, both made by Nitto Denko.

TABLE

|  | Conventional apparatus | Inventive apparatus I | Inventive apparatus II |
| --- | --- | --- | --- |
| Number of stages | 1 | 2 | 3 |
| Temperature (C.°) | 25 | 25 | 25 |
| Target concentration (Brix) | 30 | 40 | 40 |
| Pressure: Tight (MPa) |  |  | 7.2 |
| Pressure: Tight (MPa) | 9.5 | 9.7 | 9.6 |
| Pressure: Loose (MPa) |  | 9.8 | 9.7 |
| Product concentration (Brix) | 31.8 | 40.3 | 39.9 |
| Rate of concentrate produced (l/hr) | 13 | 9.65 | 23.3 |
| Rate of solution processed (l/hr) | 36.3 | 35.4 | 84.4 |
| Processing ability of membrane (l/m$^2$ · hr) | 7.56 | 7.37 | 11.7 |

In Table above, the "rate of concentrate produced" represents the amount (l) of the concentrate which was produced in a unit period of time (hr), the "rate of solution processed" represents the amount (l) of the solution which was concentrated to the product concentration in a unit period of time (hr), and the "processing ability of membrane" represents the amount (l) of the solution processed per unit area (m$^2$) of the reverse osmosis membrane.

It can be seen from Table that the multistage concentrating apparatus according to the present invention were able to obtain a concentrate of much higher concentration than the conventional one-stage apparatus simply by applying substantially the same pressure as, or a slightly higher pressure than, with the conventional apparatus, to the membrane modules. When the three concentrating units (three stages) were employed, the rate of concentrate produced, the rate of solution processed, and the processing ability of membrane were much higher than those of the one- and two-stage concentrating apparatus.

FIGS. 2 through 11 show the relationship between the processed amount of solution and the rejection percentage of loose reverse osmosis membranes employed in concentrating apparatus having two through eleven concentrating units, respectively.

Figure 2:
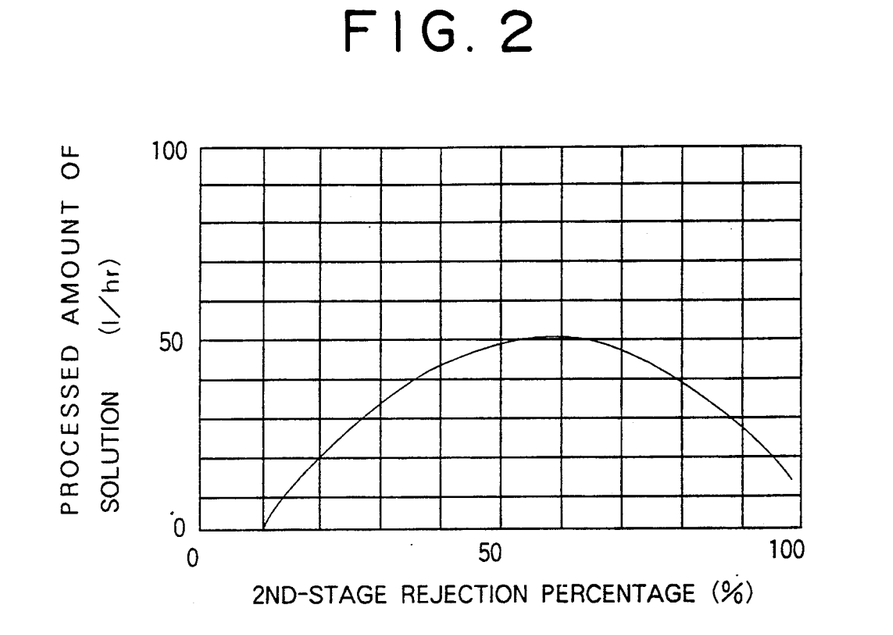
FIGS. 2 through 11 are graphs showing the relationship between the processed amount of solution and the rejection percentage of loose reverse osmosis membranes employed in concentrating apparatus having two through eleven concentrating units, respectively.
Figure 3:
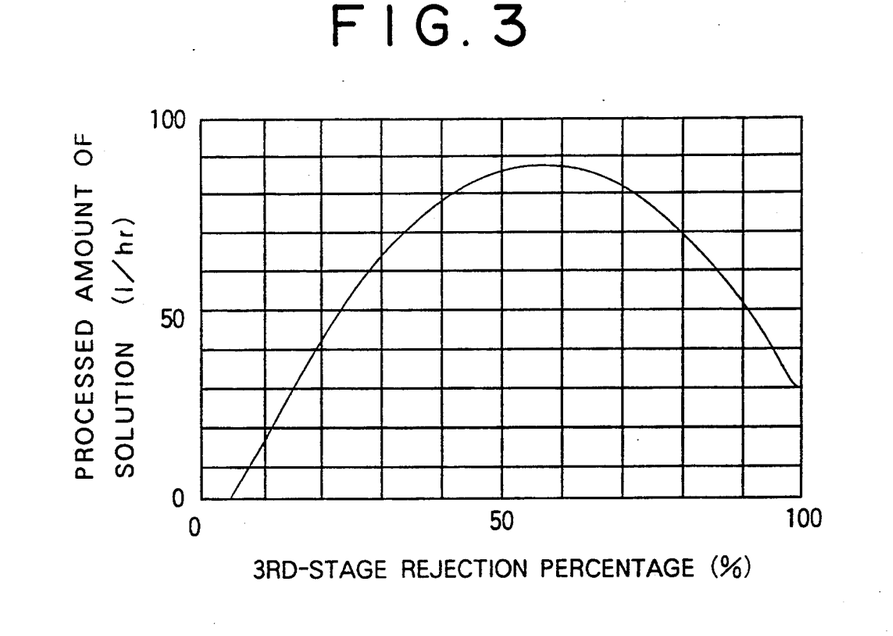
Figure 4:
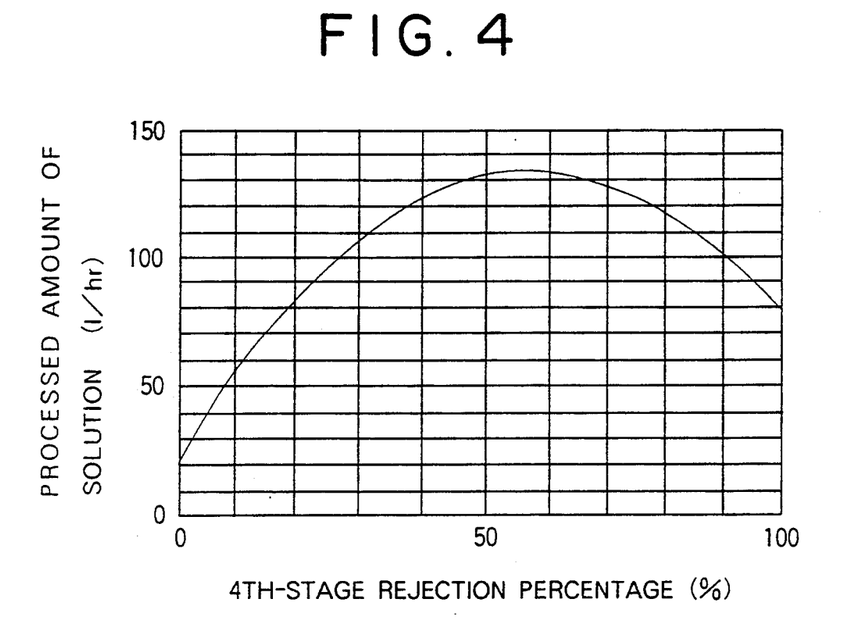

The concentrating apparatus used to produce the data shown in FIGS. 2 through 4 employed loose reverse osmosis membranes in the final concentrating units. The graphs of FIGS. 2 through 4 indicate that, with the concentrating apparatus having two through four concentrating units, the processed amount of solution is larger when the rejection percentage of the loose reverse osmosis membrane ranges from 40 to 70%.

Figure 5:
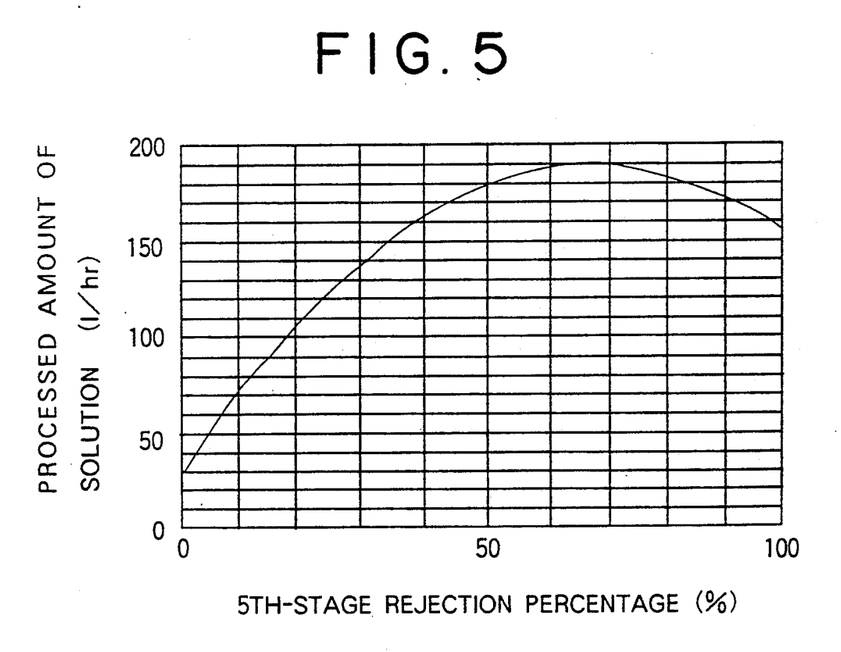
Figure 6:
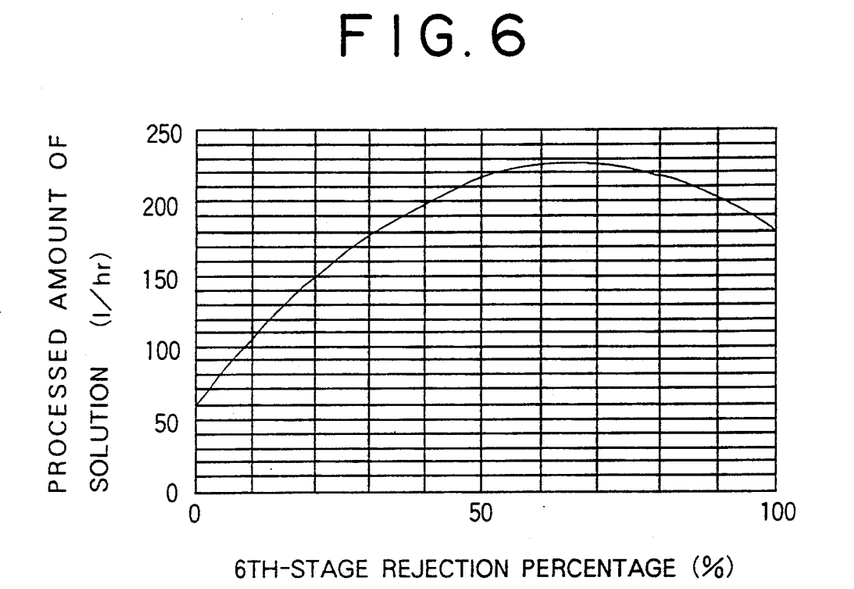
Figure 7:
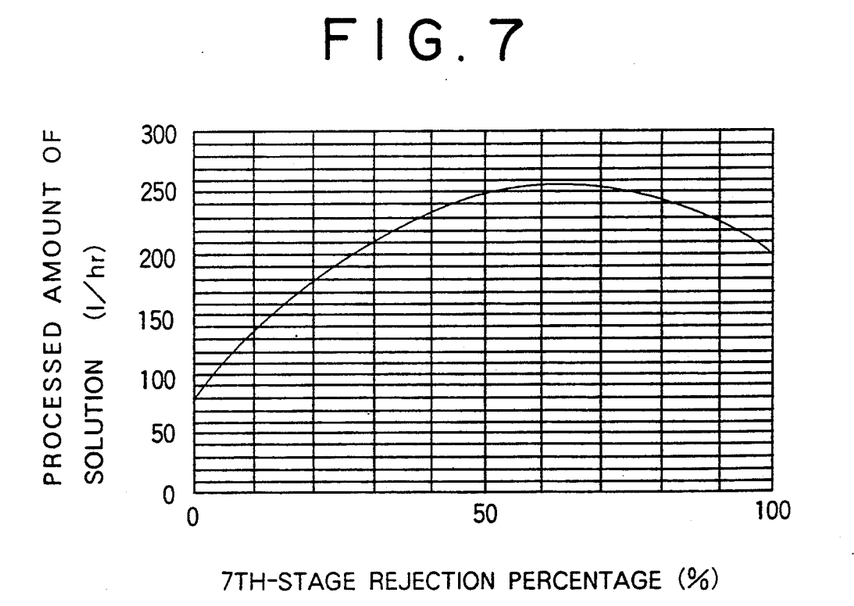
Figure 8:
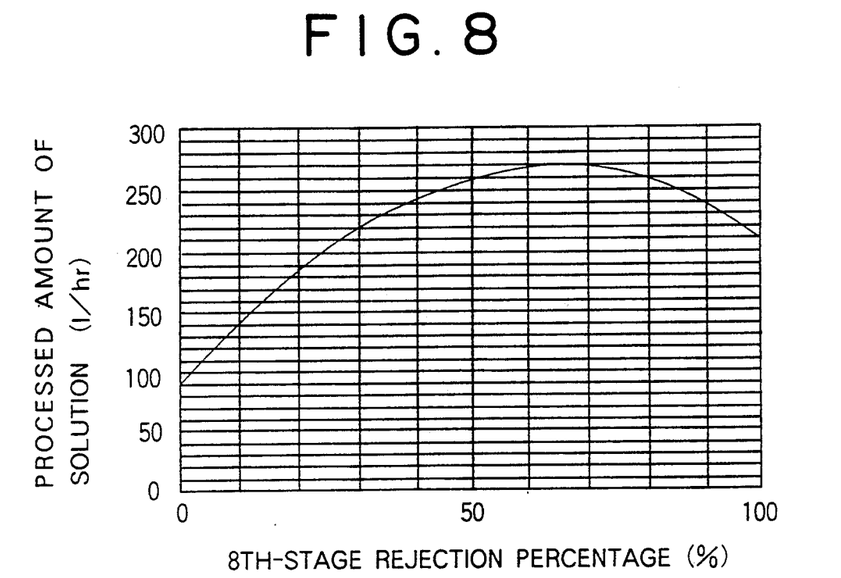
Figure 9:
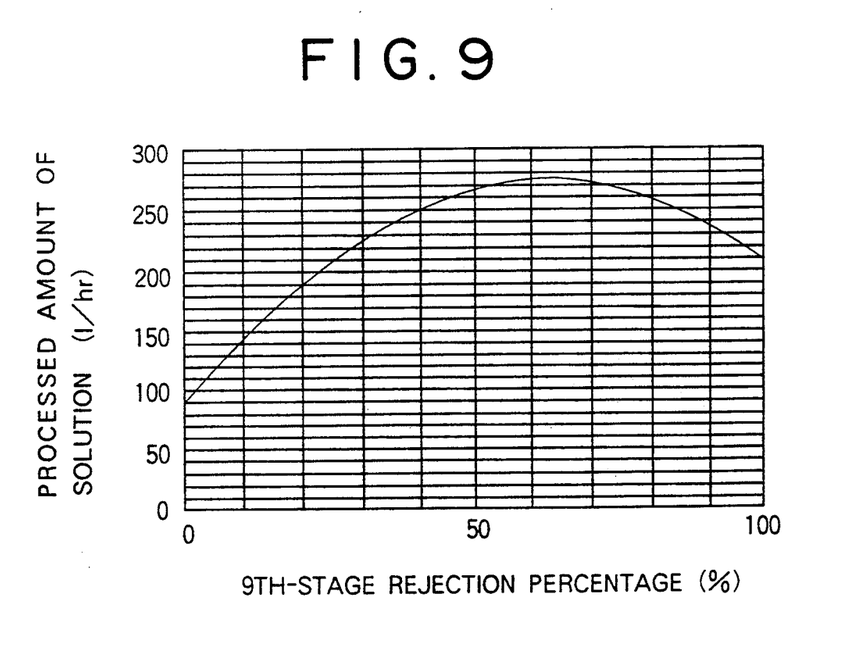
Figure 10:
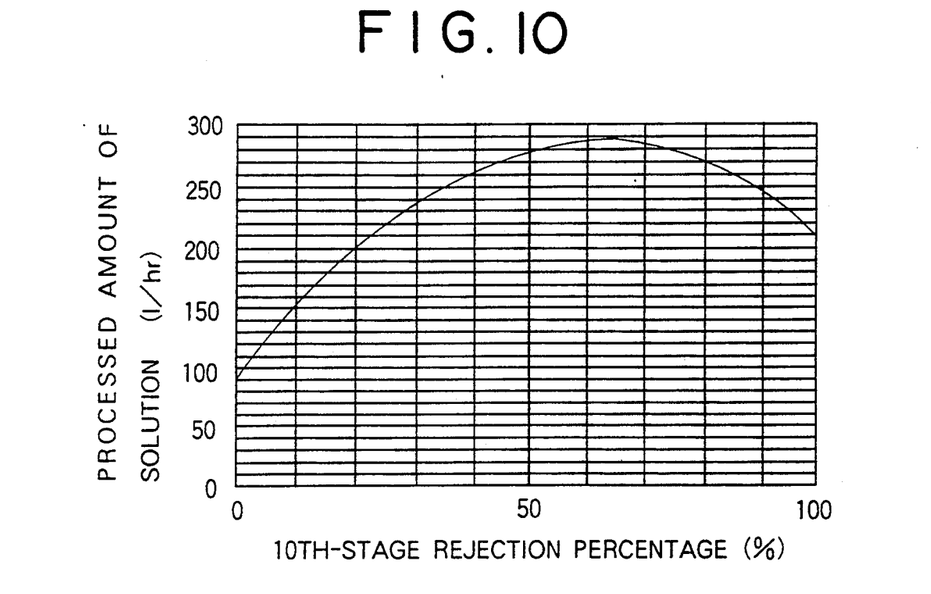
Figure 11:
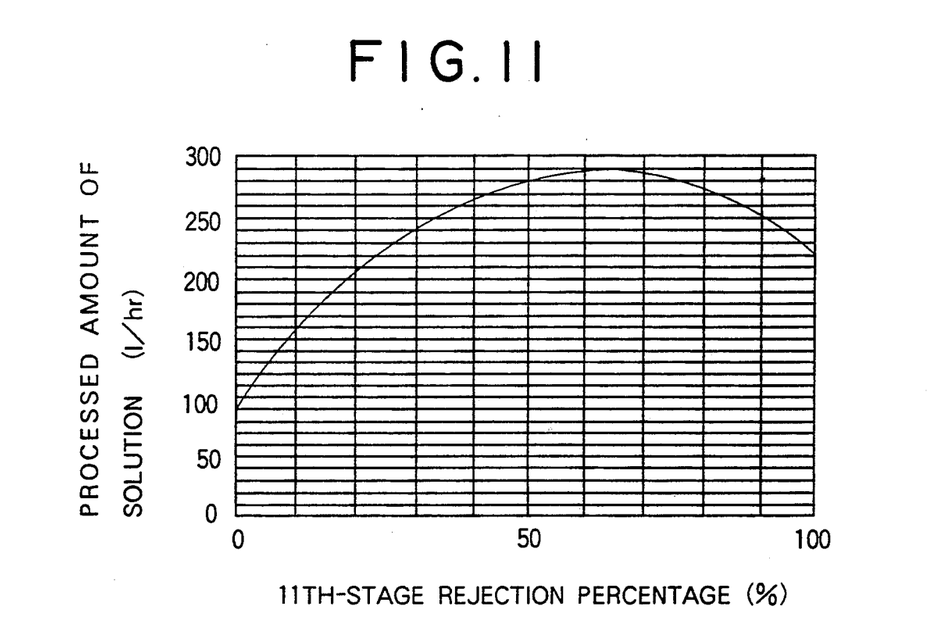

The concentrating apparatus used to produce the data shown in FIGS. 5 and 6 employed loose reverse osmosis membranes in the two downstream concentrating units. The concentrating apparatus used to produce the data shown in FIGS. 7 through 9 employed loose reverse osmosis membranes in the three downstream concentrating units. Furthermore, the four downstream concentrating units employed loose reverse osmosis membranes in the concentrating apparatus used to obtain the data shown in FIGS. 10 and 11. In each of these concentrating apparatus, the liquid having passed through the loose reverse osmosis membrane was returned to the first concentrating unit. The graphs of FIGS. 5 through 11 indicate that, with the concentrating apparatus having five or more concentrating units, the processed amount of solution is larger when the rejection percentage of the loose reverse osmosis membrane is in the range from 50 to 80%.

Figure 12:
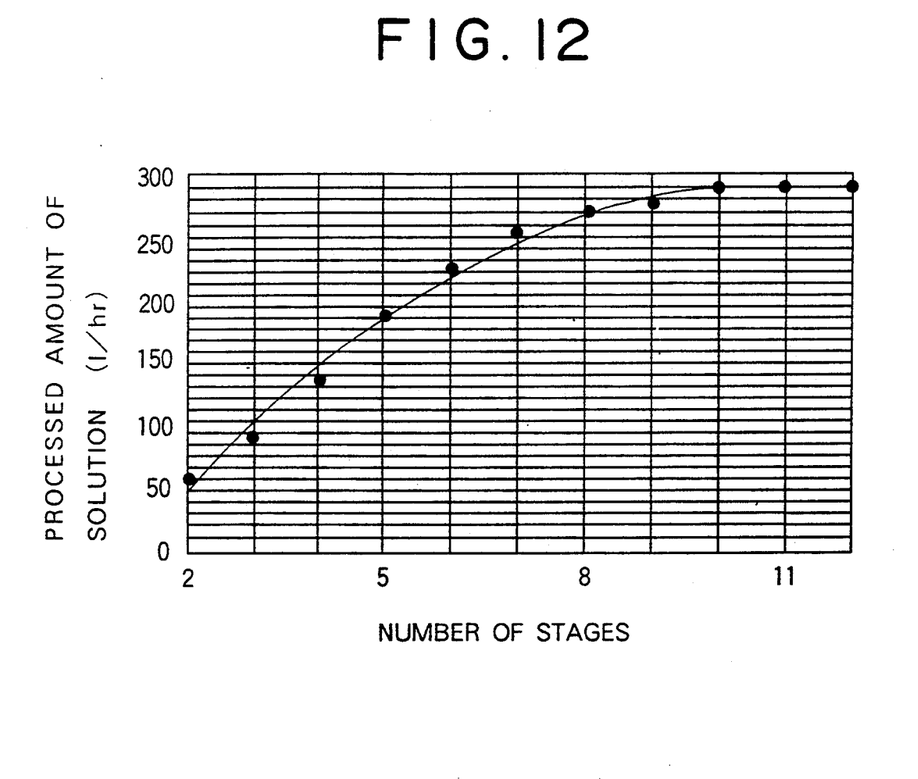
FIG. 12 is a graph showing the relationship between the number of concentrating unit stages and the processed amount of solution.

FIG. 12 illustrates the relationship between the number of concentrating unit stages and the processed amount of solution. It is clear from FIG. 12 that the processed amount of solution cannot be increased even when more than eleven concentrating units are employed. Therefore, the concentrating apparatus should employ eleven or less concentrating units, and particularly three through eleven concentrating units for better efficiency.

The ratio of the number of concentrating units which comprise tight reverse osmosis membranes to the total number of concentrating units should preferably range from ½ to ¾. For example, if the total number of concentrating units used is seven, then five upstream concentrating units should employ tight reverse osmosis membranes whereas the remaining two concentrating units should employ loose reverse osmosis membranes. If a total of eight concentrating units are used, then six upstream concentrating units should employ tight reverse osmosis membranes, and the remaining two concentrating units should employ loose reverse osmosis membranes.

The concentrating apparatus and method according to the present invention offer the following advantages:

(1) Highly concentrated products can be obtained without increasing the capacity of the pumps used;

(2) The rate of concentrate produced, the rate of solution processed, and the processing ability of the membranes are greatly increased;

(3) Because products concentrated according to the principles of the present invention have a higher concentration than conventionally concentrated products, their storage is easier and less costly.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A multistage apparatus for concentrating a solution by reverse osmosis, comprising:

means for maximizing the concentration of a solute in a solution in a multistage reverse osmosis apparatus having only standard capacity pumps, including first concentrating means for concentrating a solution, said first concentrating means comprising at least one concentrating unit and being positioned upstream with respect to a direction in which a solution to be concentrated flows, and second concentrating means for concentrating the solution which has been concentrated by said first concentrating means, said second concentrating means comprising at least one concentrating unit and being positioned downstream with respect to said direction;

said concentrating units consisting essentially of respective membrane modules and respective standard capacity pumps, the membrane module of the concentrating unit of said first concentrating means comprising a tight reverse osmosis membrane with a high rejection percentage sufficient to achieve a high concentration of said solution with a high flux density of solvent flowing through the membrane, and the membrane module of the concentrating unit of said second concentrating means comprising a loose reverse osmosis membrane with a lower rejection percentage sufficient to easily achieve a further concentration of said solution which has been concentrated by said first concentrating means with a high flux density of solution flowing through the membrane;

said lower rejection percentage of said loose reverse osmosis membrane ranges from 40-80 percent; and a total number of the concentrating units of said first and second concentrating means ranges from 3-11.

2. An apparatus according to claim 1, wherein the total number of the concentrating units of said first and second concentrating means ranges from 3 to 4, said lower rejection percentage of said loose reverse osmosis membrane ranging from 40 to 70%.

3. An apparatus according to claim 1, wherein the total number of the concentrating units of said first and second concentrating means ranges from 5 to 1, said lower rejection percentage of said loose reverse osmosis membrane ranging from 50 to 70%.

4. An apparatus according to claim 1, wherein a ratio of the number of concentrating units of said first concentrating means to the total number of concentrating units ranges from ½ to ¾.

5. An apparatus according to claim 4, wherein a concentrating unit of said second concentrating means which is located most downstream with respect to said direction includes means for detecting a concentration of the solution which has been concentrated by said membrane modules, and means for recovering the solution after it has been concentrated to a predetermined concentration.

6. An apparatus according to claim 1, wherein the concentrating units of said first and second concentrating means are arranged in series along said direction.

7. An apparatus according to claim 1, wherein each of said concentrating units comprises a tank for containing the solution, a feed pipe extending from said tank to said membrane module for supplying the solution from said tank to said membrane module, and a circulation pipe extending from said membrane module to said tank for returning the solution to said tank.

8. An apparatus according to claim 1, further comprising a return pipe extending between said concentrating unit of said second concentrating means and said concentrating unit of said first concentrating means for returning a liquid, which has passed through the loose reverse osmosis membrane of the concentrating unit of said second concentrating means to the concentrating unit of said first concentrating means.

9. A multistage method of concentrating a solution by reverse osmosis, comprising the steps of:

providing means for maximizing the concentration of a solute in a solution in a multistage apparatus having only standard capacity pumps, including steps of providing first concentrating means for concentrating a solution to a first concentration, said first concentrating means comprising at least one concentrating unit which is positioned upstream with respect to a direction in which a solution to be concentrated flows, and providing second concentrating means for concentrating the solution that has been concentrated by said first concentrating means to a second concentration which is higher than said first concentration, said second concentrating means comprising at least one concentrating unit which is positioned upstream with respect to said direction;

said concentrating units consisting essentially of respective membrane modules and respective standard capacity pumps, the membrane module of the concentrating unit of said first concentrating means comprising a tight reverse osmosis membrane with a high rejection percentage sufficient to achieve a high concentration of said solution with a high flux density of solvent flowing through the membrane, and the membrane module of the concentrating unit of said second concentrating means comprises a loose reverse osmosis membrane with a lower rejection percentage sufficient to easily achieve a further concentration of said solution which has been concentrated by said first concentrating means with a high flux density of solution flowing through the membrane;

said lower rejection percentage of said loose reverse osmosis membrane ranges from 40–80 percent; and a total number of the concentrating units of said first and second concentrating means ranges from 3-11.

10. A method according to claim 9, further comprising the step of repeating the concentration of the solution with said concentrating units of said first and second concentrating means until said first and second concentrations are achieved respectively therein.

11. A method according to claim 9, further comprising the step of returning a solution, which has passed through the loose reverse osmosis membrane of the concentrating unit of said second concentrating means to the concentrating unit of said first concentrating means.

* * * * *